United States Patent
Zhang et al.

(10) Patent No.: US 11,132,338 B1
(45) Date of Patent: *Sep. 28, 2021

(54) SHARING SERVICES BETWEEN DEDUPLICATION SYSTEMS

(71) Applicant: Veritas Technologies LLC, Santa Clara, CA (US)

(72) Inventors: Xianbo Zhang, Plymouth, MN (US); Zhuhua Yin, Shoreview, MN (US)

(73) Assignee: VERITAS TECHNOLOGIES LLC, Santa Clara, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 16/574,707

(22) Filed: Sep. 18, 2019

Related U.S. Application Data

(63) Continuation of application No. 15/085,265, filed on Mar. 30, 2016, now Pat. No. 10,445,292.

(51) Int. Cl.
*G06F 16/174* (2019.01)
*G06F 16/13* (2019.01)
*G06F 11/14* (2006.01)

(52) U.S. Cl.
CPC ...... *G06F 16/1748* (2019.01); *G06F 11/1453* (2013.01); *G06F 11/1464* (2013.01); *G06F 16/13* (2019.01)

(58) Field of Classification Search
CPC .. G06F 16/1748; G06F 16/13; G06F 11/1453; G06F 11/1464
See application file for complete search history.

(56) References Cited

U.S. PATENT DOCUMENTS 6,145,012 A   11/2000   Small
9,165,001 B1  10/2015   Upadhyay

*Primary Examiner* — Hau H Hoang
(74) *Attorney, Agent, or Firm* — Campbell Stephenson LLP

(57) ABSTRACT

Disclosed herein are methods, systems, and processes to share data storage-related services between multiple deduplication systems. In one embodiment, the method comprises receiving an indication that a local file corresponds to a shared file; virtually segmenting the shared file into a plurality of data segments, where virtually segmenting the shared file generates data segment fingerprints and library virtual mapping metadata, and the library virtual mapping metadata comprises fingerprint information corresponding to each of the plurality of data segments, and at least one of a unique file identifier, an offset of each data segment, and a size of each data segment; and transmitting the library virtual mapping metadata, where the library virtual mapping metadata is configured to be used in a subsequent deduplication operation.

20 Claims, 17 Drawing Sheets

Unique File Identifier Module 170

Shared Files Metadata Table 205

| Unique File Identifier Field 210 | File Fingerprinting Algorithm Field 212 | Segment Size Field 220 | Shared File Location Field 225 |
|---|---|---|---|
| bd2fd73jd73... | SHA-512 | 4k | Shared File Location 225(1) |
| jnd83jd83Zju9... | SHA-384 | 8k | Shared File Location 225(2) |
| y3nd93jdj228... | MD-4 | 16k | Shared File Location 225(3) |
| ... | ... | ... | ... |
| a63kd82hd4... | MD-5 | 4k | Shared File Location 225(4) |

Library Virtual Segmentation Module 175

Shared File Segmentation Table 250

| Shared File Location Field 225 | Unique File Identifier Field 210 | Segment Size Field 220 | Deduplication System Identifier Field 255 | Fingerprint Algorithm/ Fingerprint Field 215 | Offset Field 240 | Size Field 245 |
|---|---|---|---|---|---|---|
| Shared File 190(1) | bd2fd73jd73... | (Different) | 105(1) | SHA-512/h3h5hdj3... | offset01 | 8k |
| | | | | SHA-512/wejfgh532... | offset02 | 4k |
| | | | | ... | ... | ... |
| Shared File 190(2) | jnd83j83Zju9... | 4k | 105(2), 105(3) | SHA-384/fjw7ju46h... | offset01 | 4k |
| | | | | SHA-384/3dhfdfe33... | offset02 | 4k |
| | | | | SHA-384/wqj65fhr54... | offset3 | 4k |
| | | | | ... | ... | ... |

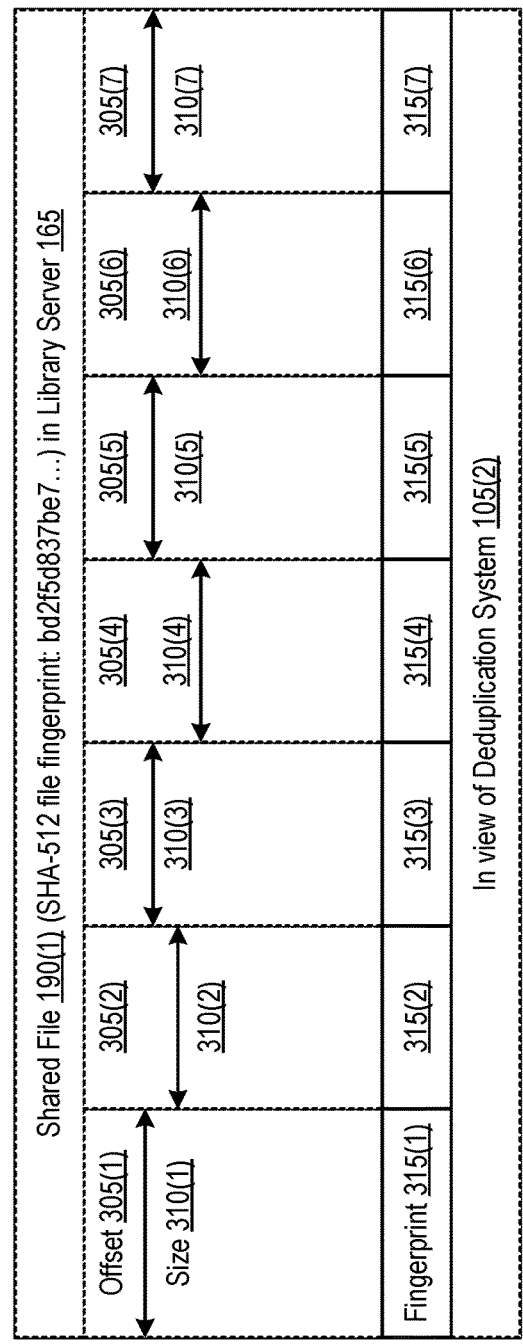

SHARING SERVICES BETWEEN DEDUPLICATION SYSTEMS

CROSS-REFERENCE TO RELATED APPLICATIONS

The present patent application is a continuation of U.S. patent application Ser. No. 15/085,265, which was filed on Mar. 30, 2016, and is entitled "Sharing Services Between Deduplication Systems," and which is incorporated by reference herein in its entirety and for all purposes.

FIELD OF THE DISCLOSURE

This invention relates to deduplication backup systems and, more particularly, to sharing data storage-related services between deduplication systems.

DESCRIPTION OF THE RELATED ART

A fingerprinting algorithm is an algorithm that maps a file and/or the file's data segments to a shorter string bit (e.g., resulting in a unique file identifier and/or data segment fingerprints, respectively). A fingerprint uniquely identifies the file and/or the file's data segments, and is typically used to avoid the comparison and transmission of bulky data. For example, a backup server can check whether a file has been modified by retrieving only the file's and/or the file's data segment fingerprint(s) and comparing the retrieved fingerprint(s) with a previously backed up copy. Therefore, fingerprint(s) may be used for data deduplication.

Existing deduplication systems manage previously backed up data and perform deduplication on newly-created data using reference counts and reference lists. Such existing deduplication systems do not treat "static" data (e.g., data that stays the same and/or is not modified, at least, frequently, such as operating system data, file system data, and the like) and "dynamic" data (e.g., user data that is modified often) differently. Because static data is not user-specific, static data can be shared between multiple deduplication systems.

Managing static data that can be potentially shared between different deduplication systems in this manner results in additional storage-related costs, requires redundant data transfer (e.g., between a backup server and one or more deduplication systems), and causes overhead with respect to reference management.

SUMMARY OF THE DISCLOSURE

Disclosed herein are systems, methods, and processes to share data storage-related services between multiple deduplication systems. One such method determines whether a shared file that exists in a library of shared files corresponds to a local file. In response to a determination that the shared file exists in the library of shared files, the method virtually segments the local file into data segments, and generates local virtual mapping metadata based, at least in part, on the data segments. The method then stores the local virtual mapping metadata.

In one embodiment, the shared file is stored by a library server, the local file is selected to be backed up and deduplicated as part of a backup and deduplication operation, and the local file is determined to be the shared file if a local file identifier generated for the local file matches a unique file identifier generated for the shared file by the library server.

In some embodiments, the local virtual mapping metadata includes at least one of a deduplication system identifier, a fingerprint generated for each data segment of the plurality of data segments, the unique file identifier, an offset of each data segment, and a size of each data segment. The local virtual mapping metadata permits identification by a backup server, of one or more data segments of the local file that can be excluded from the backup and deduplication operation.

In other embodiments, the method receives a name of the shared file and a name of a file fingerprinting algorithm used to generate the unique file identifier from the library server, and generates the local file identifier based on the file fingerprinting algorithm. The shared file is one multiple shared files stored by the library server, and the determining, the virtual segmenting, and the storing is performed by a deduplication system.

In certain embodiments, the name of the shared file and the name of the file fingerprinting algorithm is received via an Application Programming Interface (API). The method receives an indication from the library server via the API that the shared file is the local file, and transmits the local virtual mapping metadata to the library server. In one embodiment, the shared file includes non-user-sensitive data, and the shared file is shared by multiple deduplication systems.

In some embodiments, the method instructs the library server to virtually segment the shared file if the local file identifier generated for the local file matches the unique file identifier generated for the shared file by the library server. In this example, the virtual segmentation of the shared file by the library server generates library virtual mapping metadata.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, embodiments, and features made apparent to those skilled in the art, by referencing the accompanying drawings.

FIG. 2A is a shared file metadata table that contains information generated by a library server, according to one embodiment of the present disclosure.

FIG. 2C is a block diagram showing an example of a shared file segmentation table, according to one embodiment of the present disclosure.

FIG. 3A is block diagram of a shared file in view of a first deduplication system, according to one embodiment of the present disclosure.

FIG. 3B is a block diagram of a shared file in view of a second deduplication system, according to one embodiment of the present disclosure.

Figure 1:
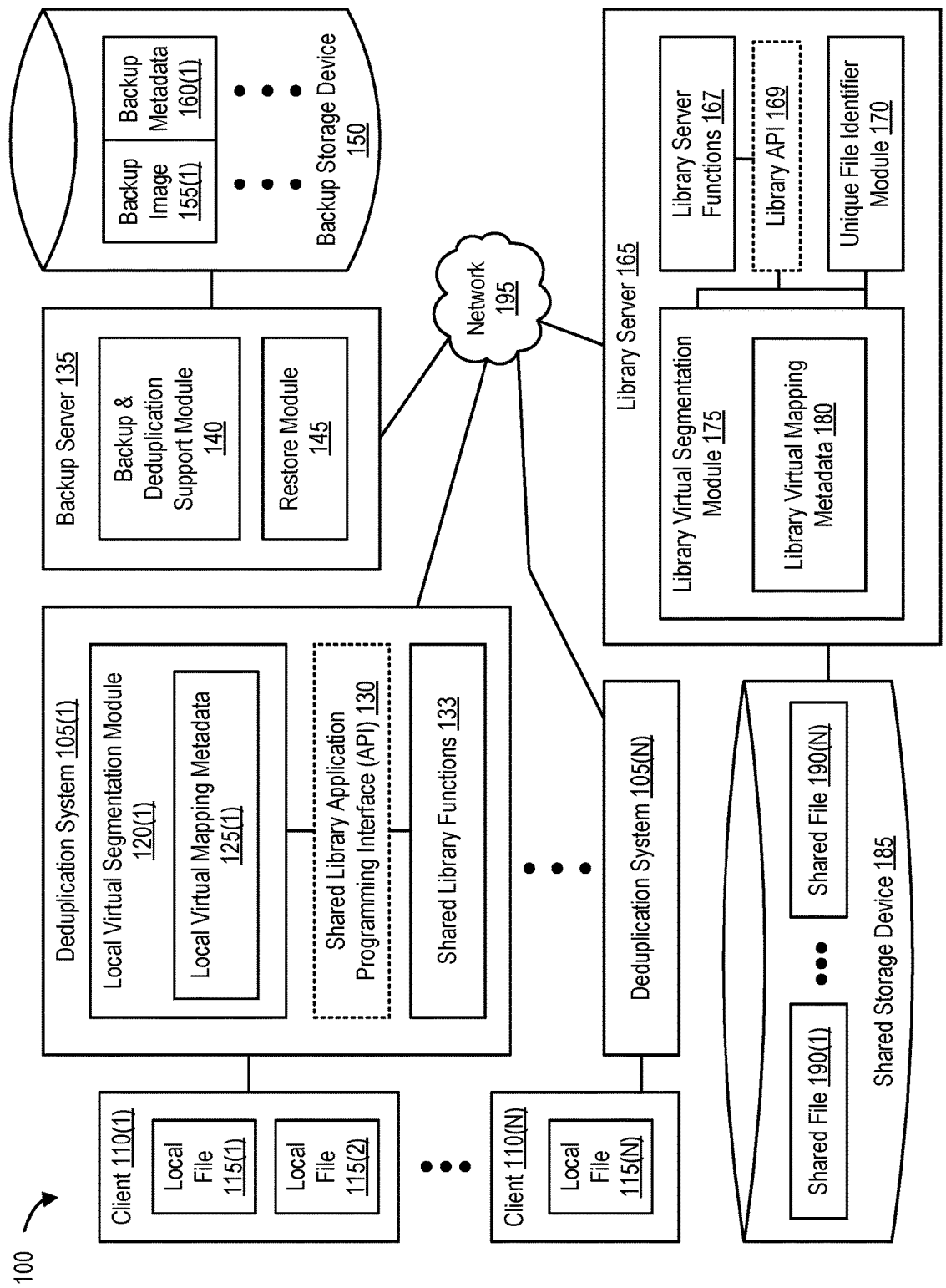
FIG. 1 is a block diagram of a computing system 100 that shares services between deduplication systems, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A fingerprinting algorithm is an algorithm that maps a large data item (e.g., a computer file) to a shorter bit string. The shorter bit string is referred to as the "fingerprint" of the data item. The fingerprint uniquely identifies the data item, much like a human fingerprint identifies a human being for security-related purposes. During a backup, clients and/or computing systems can duplicate data within a set of data to be backed up. In addition, if a set of data is backed up multiple times, data that is unchanged also results in duplicates of previously backed up data. In order to prevent backing up duplicate data from a client or multiple clients, backup systems can implement deduplication, which is a process for removing duplicate copies of data. Deduplication preserves storage space when backing up data from client systems.

Fingerprints may be used for data deduplication purposes by avoiding the comparison and transmission of bulky data. For example, a backup server can check whether a file has been modified by retrieving only the file's fingerprint (instead of the entire file), and comparing the retrieved fingerprint with that of a previously-retrieved copy of the file. A fingerprint is a value generated for a given data segment. Typically, such fingerprint values need to be substantially unique to each data segment, and thus distinguish data segments from one another. An example of a fingerprint is a hash value. For example, hashing algorithms (also called fingerprinting algorithms) such as Rabin's Algorithm, Message-Digest Algorithm 5 (MD5), Secure Hash Algorithm 512 (SHA-512), and Secure Hash Algorithm 256 (SHA-256) and the like, can be used to generate hash values.

The function of a hashing algorithm is to recreate input data from the hashing algorithm's hash value alone. The input data is typically referred to as the "message" and the hash value is typically referred to as the "message digest" or simply "digest." The ideal hashing algorithm when implemented for cryptographic purposes serves at least four functions: it is easy to compute the hash value for any given message, it is infeasible to generate a message that has a given hash value, it is infeasible to modify the message without changing the hash value, and it is infeasible to find two different messages with the same hash value.

As previously noted, existing deduplication systems do not treat static data and dynamic data differently. Because static data is non-user-specific data that can be potentially shared by multiple deduplication systems (and clients), it is disadvantageous to treat static data in the same manner as dynamic data (e.g., user-specific data), particularly when it comes to data transfer (e.g., for backup and recovery purposes) and/or reference management (e.g., maintaining information and/or metadata for deduplication purposes).

Therefore, managing static data that can be potentially shared between different deduplication systems in the foregoing manner, results in extraneous storage-related costs, requires redundant data transfer (e.g., between a backup server and one or more deduplication systems), and causes overhead with respect to reference management.

Disclosed herein are methods, systems, and processes to share data and data storage-related services between disparate deduplication systems by implementing a (shared) library server in conjunction with one or more deduplication systems.

An Example Computing System to Share Services Between Deduplication Systems

FIG. 1 is a block diagram of computing system 100 that permits the sharing of services between deduplication systems, according to one embodiment. As shown in FIG. 1, computing system 100 includes one or more deduplication systems (e.g., deduplication systems 105(1)-(N)), one or more clients (e.g., clients 110(1)-(N)), a backup server 135 communicatively coupled to a backup storage device 150, and a library server 165 communicatively coupled to a shared storage device 185. Any type of network and/or interconnection other than network 195 (e.g., the Internet, a Local Area Network (LAN), and the like) can be used to facilitate communication between deduplication systems 105(1)-(N), clients 110(1)-(N), backup server 135, and library server 165. In addition, it will be appreciated that deduplication systems 105(1)-(N), clients 110(1)-(N), backup server 135, and library server 165 can be any of a variety of different types of computing devices, including a server, personal computing device, laptop computer, cellular phone, or the like.

As shown in FIG. 1, deduplication system 105(1) includes a local virtual segmentation module 120(1) (which further generates and stores a local virtual mapping metadata 125(1)), shared library functions 133, and a shared library API 130. As part of performing backup of local files (e.g., depicted in FIG. 1 as local files 115(1)-(N)), client 110(1)

avails itself of backup services provided via deduplication system 105(1), which performs data deduplication, for example, on local file 115(1). Client 110(1) can include more than one local file (e.g., local file 115(2)), and can be implemented inside deduplication system 105(1) or, as shown in FIG. 1, can exist independently and separately.

Backup server 135 includes a backup and deduplication support module 140 and a restore module 145. Backup and deduplication support module 140 performs backup and deduplication operations on one or more files (e.g., local file 115(1)). Restore module 140 performs restore operations to recovery (or restore) one or more files (e.g., local file 115(1), for example, from a backup image. Backup storage device 150 stores a backup image 155(1) and a backup metadata 160(1).

Library server 165 includes library server functions 167 (which are accessed via a library API 169), a unique file identifier module 170, and a library virtual segmentation module 175, which further generates and stores library virtual mapping metadata 180. Virtual mapping metadata, when generated and maintained by deduplication system 105(1) is referred to herein as local virtual mapping metadata 125(1), and when generated and maintained by library server 165, is referred to herein as library virtual mapping metadata 180. Either/or of deduplication system 105(1) and library server 165 can, in various embodiments, generate, maintain, store, and share virtual mapping metadata.

Library server 165 is communicatively coupled to shared storage device 185. Shared storage device 185 stores and maintains shared files 190(1)-(N). Library server 165 can receive such shared files from one or more clients (e.g., clients 110(1)-(N)), one or more deduplication systems (e.g., deduplication systems 105(1)-(N)) or from backup server 135. It will be appreciated that backup storage device 150 and shared storage device 185 can include one or more of a variety of different storage devices, including hard disks, compact discs, digital versatile discs, one or more solid state drives (SSDs) memory such as Flash memory, and the like, or one or more logical storage devices such as volumes implemented on one or more such physical storage devices.

One technique used to reduce the amount of storage space used to store a given amount of data is known as deduplication. Deduplication involves identifying duplicate data and storing a single copy of the duplicate data, rather than storing multiple copies. For example, if two identical copies of a portion of data (e.g., a file) are stored on a storage device, deduplication involves removing one of the copies and instead storing a reference to the removed copy. If access to the removed copy is requested, the request is redirected and the reference is used to access the remaining copy. Since the reference is typically relatively small, relative to the copy of the portion of data, the added space used to store the reference is more than offset by the space saved by removing the duplicate copy.

In order to expedite the process of determining whether identical data is already stored, deduplication systems typically divide the data into portion, or segments, and calculate a signature, or fingerprint for each segment. When a segment is stored, the fingerprint that represents the segment can be added to a list of fingerprints representing stored segments. Then, by comparing a segment's fingerprint with the fingerprints included in the listing of fingerprints, the deduplication system can determine if the segment is already stored. If so, rather than store another copy of the segment, a reference is stored and a reference counter is updated.

Library server 165 can be used to improve the performance of deduplication systems because library server 165 provides one or more deduplication systems access to shared files (e.g., a library of shared file) that are not actually segmented or deduplicated.

Examples of Virtually Segmenting a Shared File and/or a Local File

FIG. 2A depicts an example of a shared files metadata table that maintains information generated by a library server, according to one embodiment. As shown in FIG. 2A, unique file identifier module 170 implemented by library server 165 generates and maintains shared file metadata information (e.g., shown in the form of a shared files metadata table 205 in FIG. 2A). Shared files metadata table 205 maintains and stores information including unique file identifiers (e.g., unique file identifier field 210), file fingerprinting algorithms (e.g., file fingerprinting algorithm field 212), the location of a shared file (e.g., shared file location field 225), and the (fixed) data segment size of the various data segments that are part of the shared file (e.g., segment size field 220).

In one embodiment, unique identifier module 170 generates a unique file identifier for each shared file (e.g., shared files 190(1)-(N)) stored in shared storage device 185 or added to shared storage device 185 using a file fingerprinting algorithm (e.g., SHA-512, MD-5, and the like). Library server 165 then publishes the names of the shared files as well as each file's unique file identifier to one or more deduplication systems. For example, and as shown in FIG. 2A, library server 165 calculates a unique file identifier for shared file 190(1) using SHA-512 file fingerprinting algorithm/technique. In some embodiments, calculating a unique file identifier for a shared file results in a determination of the shared file's fixed segment size (e.g., 4 k, 8 k, etc.). This fixed segment size information is also maintained in shared files metadata table 205.

Once library server 165 calculates a unique file identifier for one or more shared files and publishes the unique file identifiers (along with the unique file identifier's corresponding shared file), library server 165 publishes a set of APIs (e.g., shared library API 130) so that a local file (e.g., local file 115(1)) can be virtually segmented into data segments, and fingerprints can be generated for each data segment. If a local file is a shared file (e.g., if the file fingerprint calculated for the local file matches a unique file identifier received from library server 165 via shared library API 130), either library server 165 can virtually segment the shared file or deduplication system 105(1) can virtually segment the local file. In either case, regardless of which entity performs the virtual segmenting, virtually segmenting either a local file or a shared file generates virtual mapping metadata.

It will be appreciated that if library server 165 performs the virtual segmenting of a shared file, the virtual mapping metadata is referred to herein as library virtual mapping metadata (and so is depicted in FIG. 1 as, for example, library virtual mapping metadata 180), and if deduplication system 105(1) performs the virtual segmenting of the local file, the virtual mapping metadata is referred to herein as local virtual mapping metadata (and so is depicted in FIG. 1 as library virtual mapping metadata 125(1)). Such virtual mapping metadata can be shared by library server 165 and/or deduplication system 105(1) with backup server 135 and/or one or more different deduplication systems (e.g., deduplication system 105(N)).

Figure 2B:
FIG. 2B is a local file segmentation table that contains information generated by a deduplication system, according to one embodiment of the present disclosure.

FIG. 2B is a local file segmentation table that contains information generated by a deduplication system, according to one embodiment. If a local file is a shared file (e.g., if the file fingerprint calculated for the local file matches a unique file identifier received from library server 165 via shared library API 130), deduplication system 105(1) can virtually segment the local file using local virtual segmentation module 120(1). Virtually segmenting a local file generates metadata information shown in local file segmentation table 230 of FIG. 2B.

For example, local virtual segmentation module 120(1) can virtually segment a local file identified in local file location field 235 (e.g., local file 115(1) identified by local file location 235(1)) and can record local virtual mapping metadata 125(1) that includes a unique file identifier for a shared file that matches a file fingerprint of local file 115(1), a fingerprinting algorithm and the fingerprint generated for each data segment of local file 115(1) using that fingerprinting algorithm (e.g., SHA-512) (e.g., as shown in fingerprint algorithm/fingerprint field 215), an offset of each data segment of the local file (as shown in offset field 240), and a data segment size of each data segment of the local file (e.g., as shown in size field 245). In addition to the foregoing information, a deduplication system identifier of one or more deduplication systems that are associated with the local file can also be recorded by local virtual segmentation module 120(1). Information for files not on library server 165 (e.g., local file 115(N) identified by local file location 235 (N)) can simply be excluded from local file segmentation table 230.

FIG. 2C is a shared file segmentation table that contains information generated by a library server, according to one embodiment. As previously noted, either deduplication system 105(1) or library server 165 can virtually segment a local file or a shared file, respectively (as long as the local file is the shared file—a determination that can be based, for example, on a comparison of a file fingerprint calculated by deduplication system 105(1) for the local file and a unique file identifier calculated by library server 165 for the shared file).

As shown in FIG. 2C, library virtual segmentation module 175 generates library virtual mapping metadata 180 by virtually segmenting a shared file (if the shared file is a local file). A part of the information generated by virtually segmenting the shared file, and/or recorded during the virtual segmentation process, is shown in shared file segmentation table 250. For example, shared file 190(1) is identified as being a local file (e.g., local file 115(1)) in shared file location field 225 based on the shared file's unique file identifier. FIG. 2C also notes that shared file 190(1) is a local file that is associated with deduplication system 105(1) in deduplication system identifier field 255.

As part of the virtual segmentation process, library virtual segmentation module 175 first determines if the shared file should be virtually segmented into data segments of different sizes (e.g., as indicated by segment size field 220 which indicates that shared file 190(1) requires virtual segmentation with different data segment sizes). Consequently, library virtual segmentation module 175 virtually segments shared file 190(1) using a segmentation algorithm and calculates a fingerprint for each variable-sized data segment, for example, using SHA-512 fingerprinting algorithm/technique. This process generates (and records) a fingerprint for each data segment of shared file 190(1) as well the offset of each data segment, and a variable-size of each data segment. It should be noted that more than one deduplication system can be identified by deduplication system identifiers stored in deduplication system identifier field 255, in the case in which shared file segmentation table 250 is designed to support storage of deduplication system identifiers for those deduplication systems employing the same fingerprinting algorithm/technique and the same segmentation algorithm.

Therefore, in this manner, a deduplication system can maintain the (virtual) mapping of data segment fingerprints and location mapping (e.g., of the shared file that is the local file) regardless of whether the data segment is stored and maintained by the library server (e.g., in shared storage device 185 as one or more shared files), or by the deduplication system itself (e.g., as a segmented/deduplicated local file). It will be appreciated that storage and data transfer consumption is reduced because library server 165 maintains, manages, and stores shared files that are local files and hence the local files, or one or more data segments thereof, do not need to be backed up and deduplicated. In addition, because each deduplication system is capable of performing its own reference management (e.g., recording and maintaining virtual mapping metadata), no reference needs to be maintained by library server 165 (or at least, any such maintenance is optional).

FIG. 3A is block diagram of a shared file in view of a first deduplication system, according to one embodiment. Similarly, FIG. 3B is a block diagram of the same shared file in view of a second deduplication system, according to another embodiment. As shown in FIG. 3A, shared file 190(1) (with a unique file identifier (or file fingerprint) calculated based on SHA-512) is stored by library server 165. If virtual segmentation is performed by deduplication system 105(1), shared file 190(1) is virtually segmented into five data segments, each with a potentially different data segment size (e.g., based on a particular segmentation algorithm implemented by deduplication system 105(1)) and data segment fingerprint (based on a particular fingerprinting algorithm implemented by deduplication system 105(1)).

Similarly, if virtual segmentation is performed by deduplication system 105(2) (a different deduplication system), the same shared file (e.g., shared file 190(1)), can be virtually segmented into seven data segments, each with a particular data segment size (e.g., based on a particular segmentation algorithm implemented by deduplication system 105(2)) and data segment fingerprint (based on a particular fingerprinting algorithm implemented by deduplication system 105(2)).

Therefore, when a given deduplication system performs a backup and deduplication operation, the given deduplication system queries library server 165 by presenting its deduplication system identifier and one or more data segment fingerprints generated based on a local file (if that local file corresponds to a shared file stored by library server 165). If, based on the deduplication system identifier (and/or fingerprint/segmentation information), a fingerprint for a particular data segment of a shared file is found in library server 165 (e.g., as part of library virtual mapping metadata 180), then the given deduplication system can exclude the corresponding data segment of the local file from the backup and deduplication operation. Because a local file that is a shared file can be virtually segmented differently (e.g., based on different data segment sizes, segmentation algorithms, fingerprinting algorithms, and the like) by different deduplication systems, (shared) data is not stored is a segmented fashion because the segmentation can be performed virtually by any deduplication system that has access to library server 165 (and the shared files). In addition, there is no reference management needed for data sharing within library server 165 and data locality is automatically preserved to improve the performance of (data) restore operations.

Example Embodiments for Sharing Services Between Deduplication Systems

In one embodiment, deduplication system 105(1) determines that shared file 190(1) that exists in a library of shared files corresponds to local file 115(1)). In response to a determination that shared file 190(1) exists in the library of shared files, deduplication system 105(1) can virtually segment local file 115(1) into data segments, and generate local virtual mapping metadata 125(1) based, at least in part, on the data segments. Deduplication system 105(1) then stores local virtual mapping metadata 125(1)).

In some embodiments, shared file 190(1) is stored by library server 165, local file 115(1) is selected to be backed up and deduplicated as part of a backup and deduplication operation, and local file 115(1) is determined to be shared file 190(1) if a local file identifier generated for local file 115(1) (e.g., a file fingerprint) matches a unique file identifier generated for shared file 190(1) by the library server 165 (e.g., using unique file identifier module 170). In other embodiments, local virtual mapping metadata 125(1) includes at least one of a deduplication system identifier, a fingerprint generated for each data segment of the plurality of data segments, the unique file identifier, an offset of each data segment, and a size of each data segment. Local virtual mapping metadata 125(1) permits identification by backup server 135, of one or more data segments of local file 115(1) that can be excluded from the backup and deduplication operation.

In one embodiment, deduplication system 105(1) receives a name of shared file 190(1) and a name of a file fingerprinting algorithm used to generate the unique file identifier from library server 165, and generates the local file identifier based on the file fingerprinting algorithm. Shared file 190(1) is one multiple shared files stored by library server 165 (e.g., in shared storage device 185), and the determining, the virtual segmenting, and the storing is performed by deduplication system 105(1). In another embodiment, the name of shared file 190(1) and the name of the file fingerprinting algorithm is received via shared library API 130. Deduplication system 105(1) receives an indication from library server 165 via library API 130 that shared file 190(1) is local file 115(1), and transmits local virtual mapping metadata 125(1) to library server 165. In this example, shared file 190(1) includes non-user-sensitive data, and shared file 190(1) is shared by multiple deduplication systems.

In certain embodiments, deduplication system 105(1) instructs library server 165 to virtually segment shared file 190(1) if the local file identifier generated for local file 115(1) matches the unique file identifier generated for shared file 190(1) by library server 165. In this example, the virtual segmentation of shared file 190(1) by library server 165 generates library virtual mapping metadata 180.

It will be appreciated that because a local file that is a shared file can be virtually segmented differently (e.g., based on various segmentation algorithms, fingerprinting algorithms, and the like) by multiple different deduplication systems, shareable data is not stored is a segmented fashion because the segmentation can be performed virtually by any deduplication system that has access to a library of shared files. In addition, there is no reference management needed for data sharing within the library server and data locality is automatically preserved to improve the performance of restore operations. It will also be appreciated that managing data that can be potentially shared between different deduplication systems using the methods, systems, and processes described herein decreases extraneous storage-related costs, minimizes redundant data transfer (e.g., between a backup server and one or more deduplication systems), and reduces overhead with respect to reference management.

Example Processes to Share Services Between Deduplication Systems

Figure 4A:
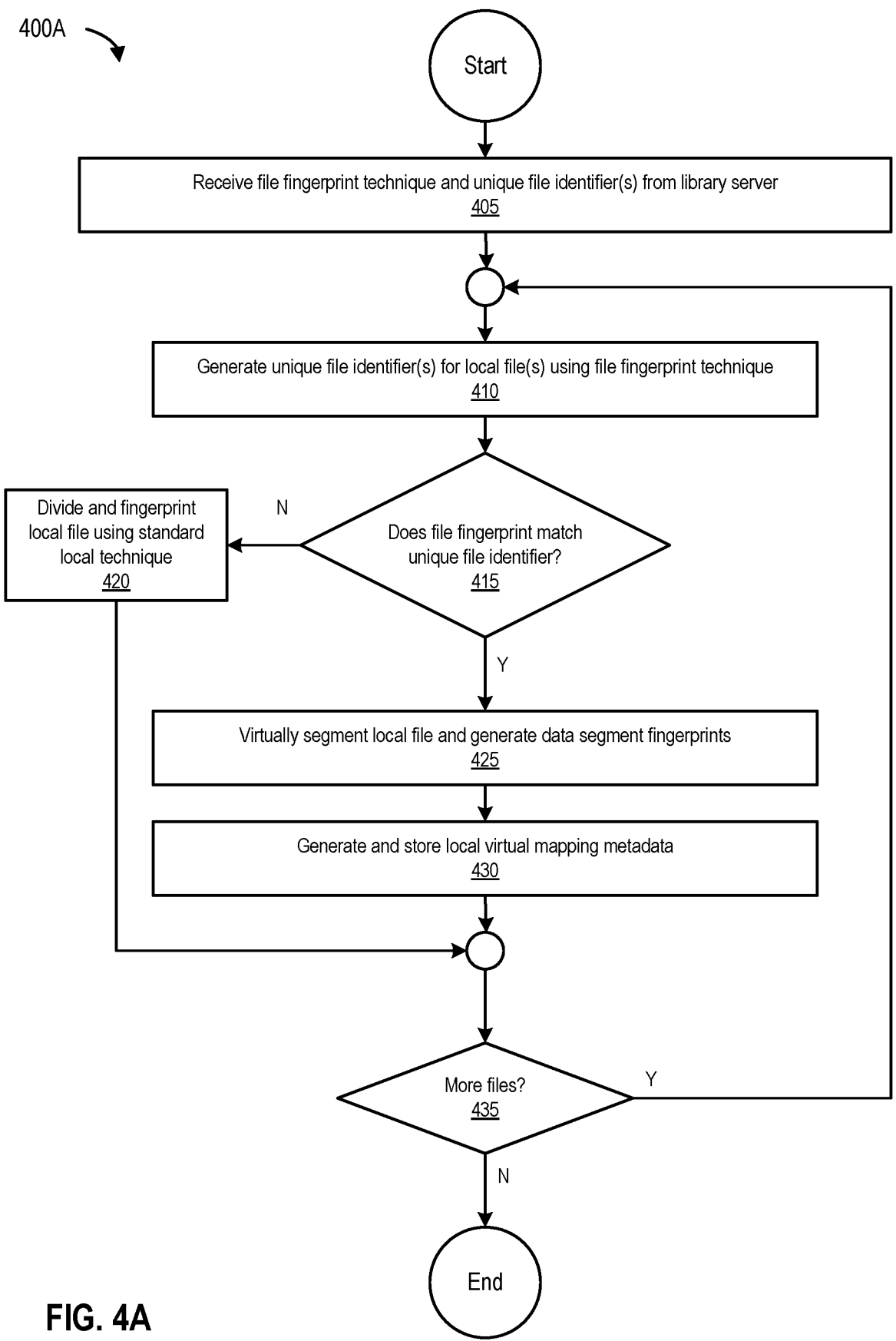
FIG. 4A is a flowchart that illustrates a process for generating local virtual mapping metadata, according to one embodiment of the present disclosure.

FIG. 4A is a flowchart that illustrates a process for generating local virtual mapping metadata, according to one embodiment. The process begins at 405 by receiving a file fingerprint technique and unique file identifier(s) (e.g., generated by unique file identifier module 170) from library server 165. At 410, the process generates unique file identifier(s) (e.g., local file fingerprints) for local file(s) using the file fingerprint technique (e.g., SHA-512). At 415, the process determines whether the file fingerprint generated for the local file matches the unique file identifier received from library server 165. The process of 415 can be performed by either the library server or the deduplication system. If the file fingerprint does not match the unique file identifier, the process proceeds to 420 by dividing (e.g., segmenting) and fingerprinting the local file using a standard local fingerprinting technique, after which, a determination is made as to whether additional files remain to be processed (435). If additional files remain, the process loops to 410 and processes the next file, otherwise, the process concludes.

However, if the file fingerprint matches the unique file identifier, the process, at 425, virtually segments the local file (e.g., local file 115(1)) and generates data segment fingerprints. At 430, the process generates and stores local virtual mapping metadata (e.g., local virtual mapping metadata 125(1) as shown in FIG. 1) and ends at 435 by determining if there are more files to the processed. Otherwise, the process loops to processing the next file, at 410.

Figure 4B:
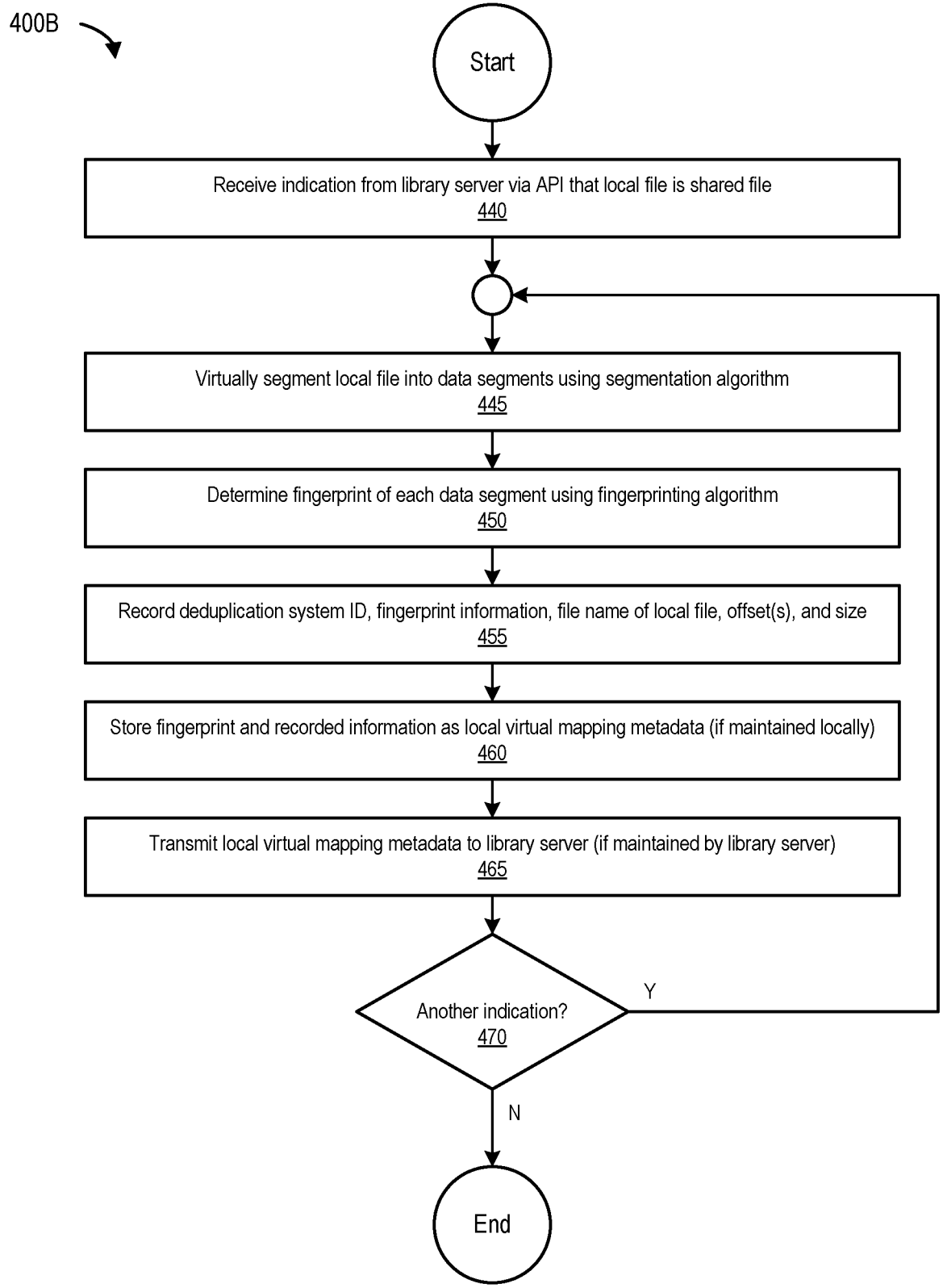
FIG. 4B is a flowchart that illustrates a process for sharing local virtual mapping metadata, according to one embodiment of the present disclosure.

FIG. 4B is a flowchart that illustrates a process for sharing local virtual mapping metadata, according to one embodiment. The process begins at 440 by receiving an indication (or indicators) from library server 165 (e.g., via shared library API 130) that one or more local files (e.g., local file 115(1)) are shared files (e.g., shared file 190(1)). At 445, the process virtually segments the local file into data segments using a segmentation technique. At 450, the process determines (or calculates) the fingerprint of each data segment using a fingerprinting algorithm (e.g., MD-4). At 455, the process records a deduplication system identifier (e.g., a deduplication system identifier for deduplication system 105(1)), fingerprint information (e.g., the name of the fingerprinting algorithm, as well as fingerprints generated using that fingerprinting algorithm as shown in fingerprint algorithm/fingerprint field 215 of FIG. 2B), file name of the local file (e.g., local file 115(1)), offsets of the data segments of the local file, and a size of each data segment. It will be appreciated that depending on the segmentation algorithm used, data segment size and offset information can be recorded (e.g., as metadata information), for both fixed-size and variable-size data segments.

At 460, the process stores fingerprint and recorded information as local virtual mapping metadata if local virtual mapping metadata 125(1) is maintained locally on deduplication system 105(1)). At 465, the process transmits local virtual mapping metadata to library server 165, if library server 165 maintains this generated metadata information as part of library virtual mapping metadata 180. It should be noted that the process can store fingerprint and recorded information as local virtual mapping metadata and/or transmit local virtual mapping metadata to library server 165. The process ends at 470 by determining if there is another indication.

Figure 5A:
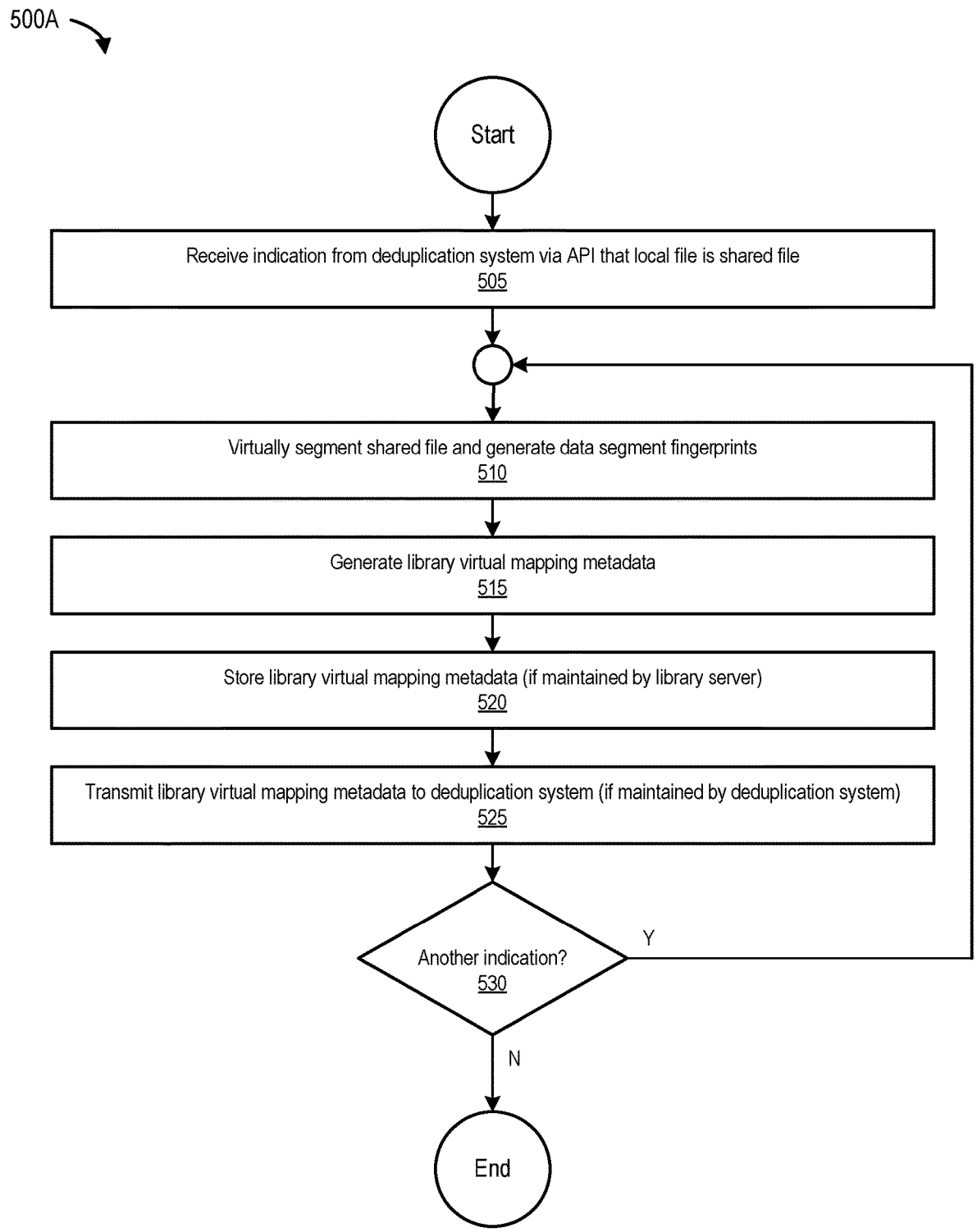
FIG. 5A is a flowchart that illustrates a process for generating library virtual mapping metadata, according to one embodiment of the present disclosure.

FIG. 5A is a flowchart that illustrates a process for generating library virtual mapping metadata, according to one embodiment. The process begins at 505 by receiving an indication (e.g., as part of one or more indicators) from a deduplication system (e.g., deduplication system 105(1)) via an API (e.g., library API 169) that a local file (e.g., local file 115(1)) is a shared file (e.g., shared file 190(1)). At 510, the process virtually segments the shared file and generates data segment fingerprints (e.g., using library virtual segmentation module 175). At 515, the process generates library virtual mapping metadata (e.g., library virtual mapping metadata 180).

At 520, the process stores library virtual mapping metadata if maintained by library server 165 and/or at 525, transmits library virtual mapping metadata to deduplication system 105(1) if this generated metadata information is maintained by deduplication system 105(1) (e.g., as part of local virtual mapping metadata 125(1)). The process proceeds to 530, where a determination is made as to whether another indication is waiting to be processed. If so, the process loops to 510, and processes the indication, as noted. Otherwise, the process concludes.

Figure 5B:
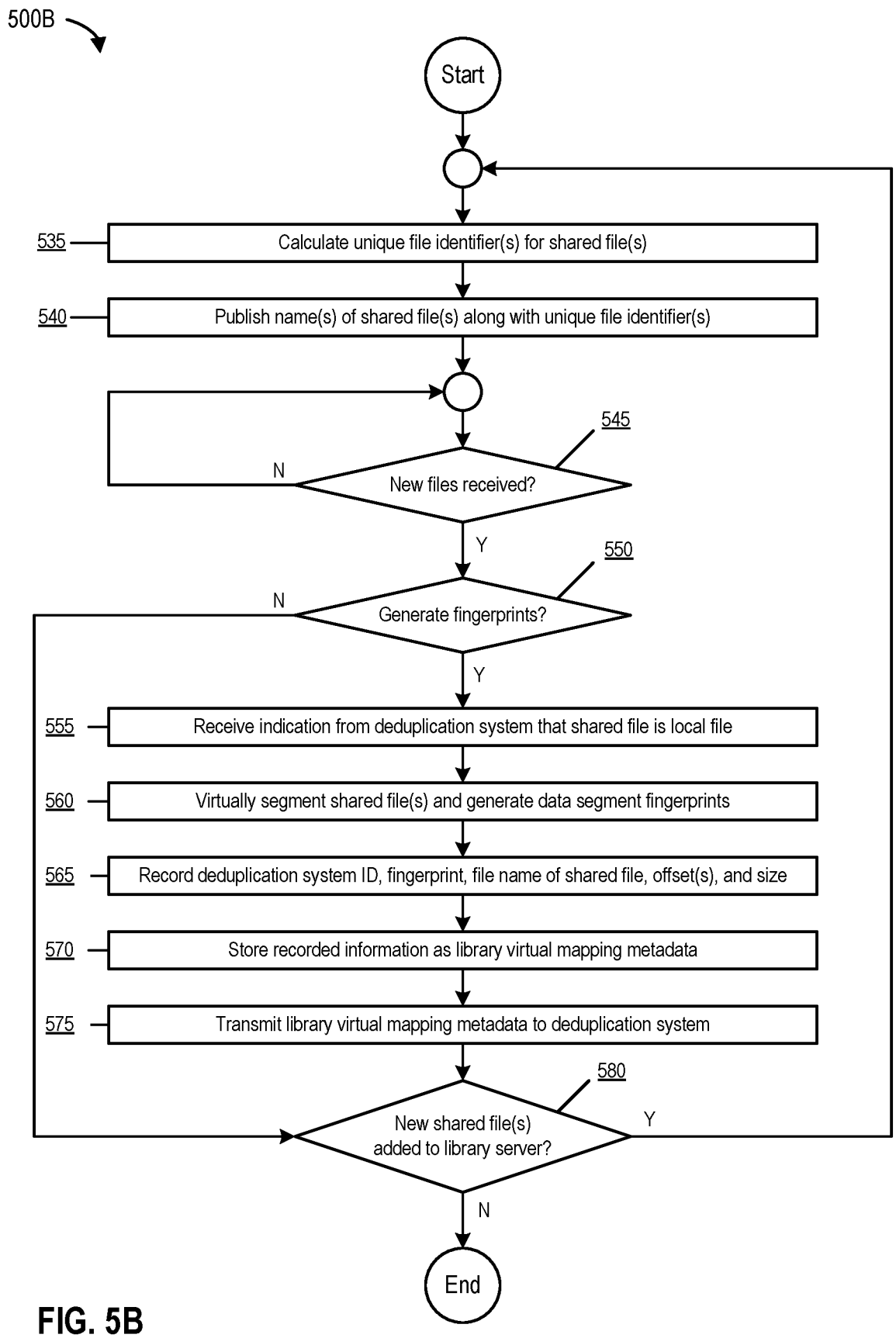
FIG. 5B is a flowchart that illustrates a process for sharing library virtual mapping metadata, according to one embodiment of the present disclosure.

FIG. 5B is a flowchart that illustrates a process for sharing library virtual mapping metadata, according to one embodiment. The process begins at 535 by calculating unique file identifier(s) for shared file(s) (e.g., using unique file identifier module 170 to calculate unique file identifiers for shared files 190(1)-(N)). At 540, the process publishes the name(s) of the shared file(s) along with unique file identifier(s). At 545, the process determines if a new file has been received. If a new file has been received, the process, at 550, determines whether fingerprints have to be generated for the new file. If fingerprints do not have to be generated, the process ends at 580 by determining if a new shared file has been added to the library.

However, if fingerprints are to be generated for the new file, the process, at 555, receives an indication from a deduplication system that a shared file is a local file. At 560, the process virtually segments shared file(s) and generates data segment fingerprints for each virtually segmented shared file. At 565, the process records a deduplication system ID (e.g., a deduplication system identifier as shown in FIG. 2C), the data segment fingerprints, the file name of the shared file, offset(s) of the data segments, and the size of the data segments.

At 570, the process stores the recorded (metadata) information as library virtual mapping metadata (e.g., library virtual mapping metadata 180). At 575, the process transmits the library virtual mapping metadata to the deduplication server (e.g., to deduplication system 105(1) to be stored and/or maintained as part of (or in association with) local virtual mapping metadata 125(1)). The process ends at 580 by determining whether new shared file(s) have been added to library server 165 (e.g., to a library of shared files).

Figure 6A:
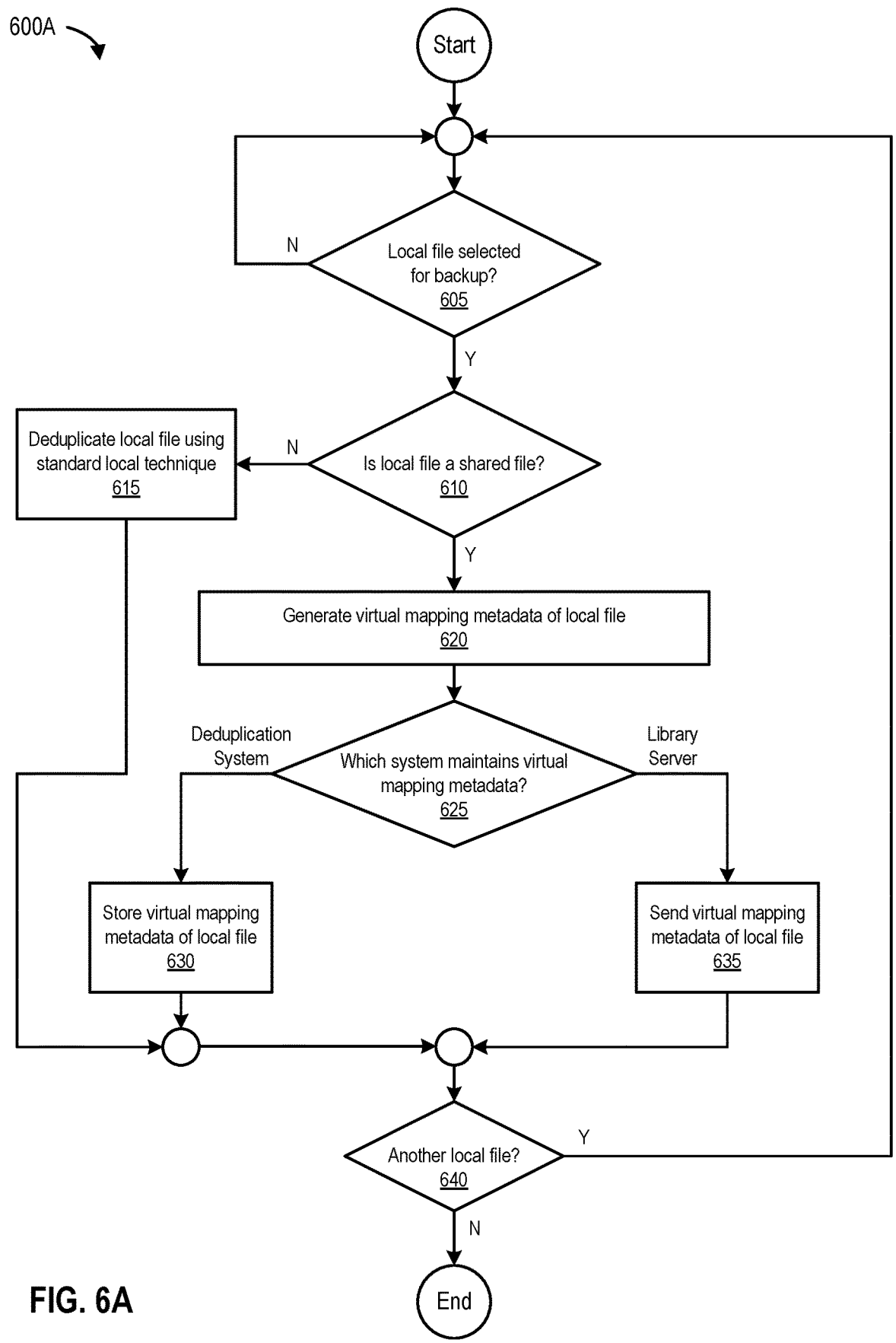
FIG. 6A is a flowchart that illustrates a process for performing a backup operation using virtual mapping metadata, according to one embodiment of the present disclosure.

FIG. 6A is a flowchart that illustrates a process for performing a backup operation using virtual mapping metadata, according to one embodiment. The process begins at 605 by determining whether a local file is selected for backup (e.g., as part of a backup and deduplication operation). If the local file is selected for backup, the process, at 610, determines whether the local file is a shared file (e.g., based on a unique file identifier calculated for the shared file by library server 165). If the local file is not a shared file, the process, at 615, deduplicates the local file using a standard local technique, and proceeds to 640, where a determination is made as to whether another local file has been selected for backup. If further local files remain to be processed, the process loops to 605. Otherwise, the process concludes.

However, if the local file is a shared file, the process generates virtual mapping metadata of the local file. At 625, the process determines which system and/or server maintains virtual mapping metadata. If a deduplication system maintains virtual mapping metadata (e.g., deduplication system 105(1)), the process, at 630, stores the virtual mapping metadata of the local file (e.g., as local virtual mapping metadata 125(1)). If library server 165 maintains virtual mapping metadata, the process, at 635, sends virtual mapping metadata of the local file (e.g., to library server 165 to be stored and/or mainlined as library virtual mapping metadata 180)). The process ends at 640 by determining whether another local file has been selected for backup.

Figure 6B:
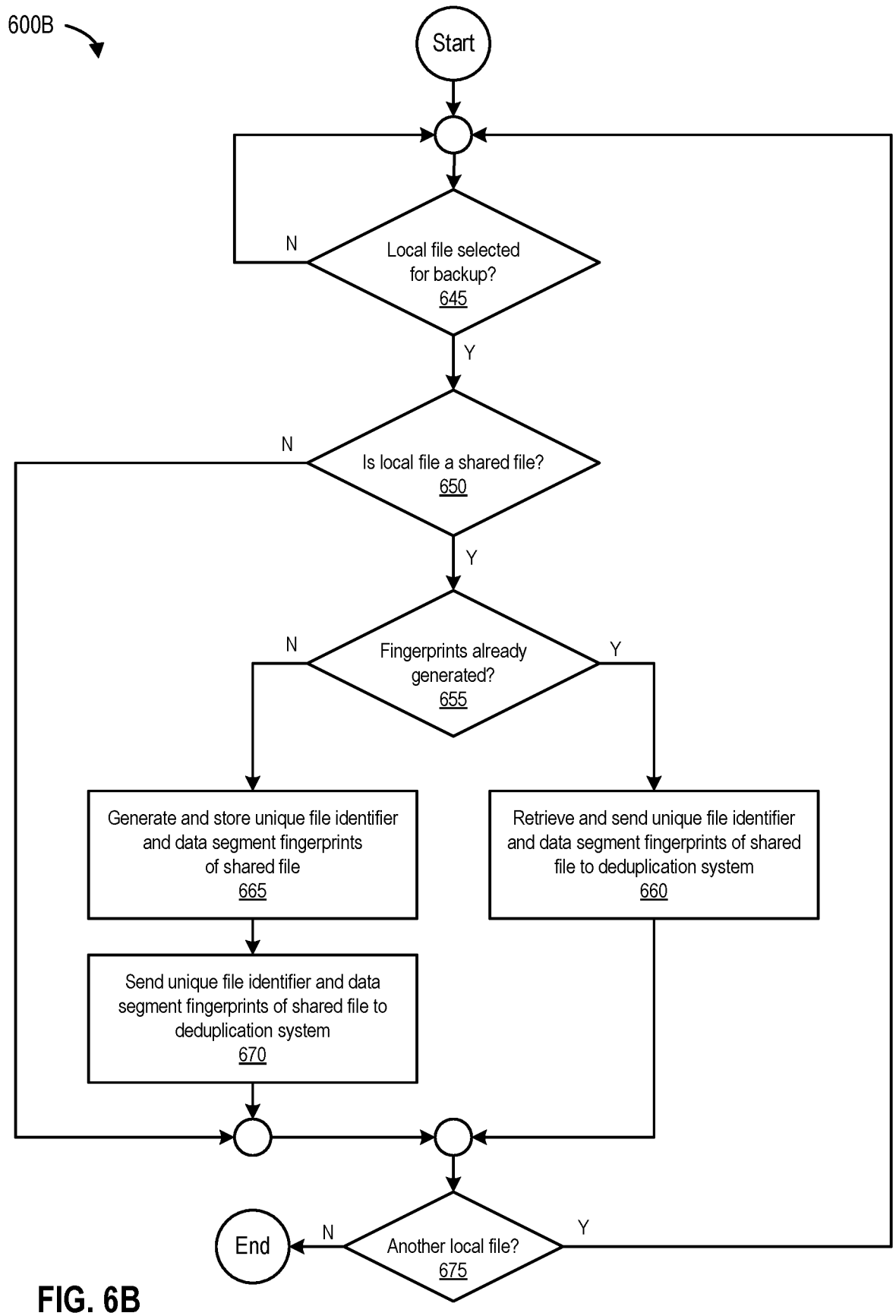
FIG. 6B is a flowchart that illustrates a process for performing a backup operation using virtual mapping metadata, according to one embodiment of the present disclosure.

FIG. 6B is a flowchart that illustrates a process for performing a backup operation using virtual mapping metadata, according to one embodiment. The process begins at 645 by determining whether a local file has been selected for backup. If a local file has been selected for backup, the process, at 650, determines whether the local file is a shared file. If the local file is not a shared file, the process loops to 675 where a determination is made as to whether another local file is waiting processed. If so, the process loops to 645, and processes the local file, as noted. Otherwise, the process concludes.

However, if the local file is a shared file, the process, at 655, determines whether fingerprints (e.g., data segment fingerprints) have already been generated for the shared file. If fingerprints already been generated, the process, at 660, retrieves and sends the unique file identifier (of the shared file) and data segment fingerprints of the shared file to the deduplication system. However, if fingerprints have not been generated, the process, at 665, generates and stores the unique file identifier and data segment fingerprints of the shared file (e.g., as library virtual mapping metadata 180), and at 670, sends the unique file identifier and the data segment fingerprints of the shared file to the deduplication system. The process loops to 675 where a determination is made as to whether another local file is waiting to be processed. If so, the process loops to 645, and processes the local file, as noted. Otherwise, the process concludes.

Figure 7A:
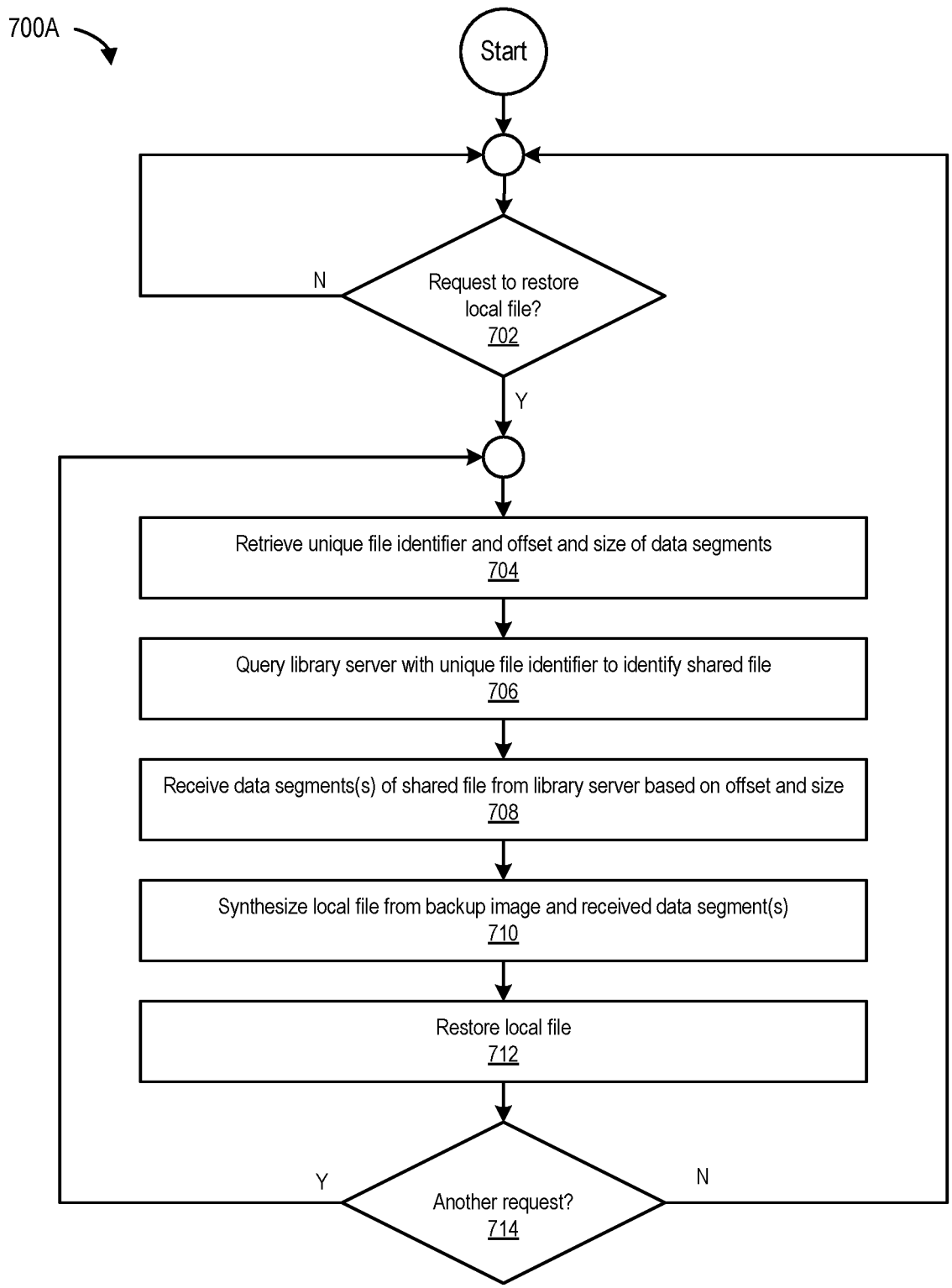
FIG. 7A is a flowchart that illustrates a process for performing a restore operation, according to one embodiment of the present disclosure.

FIG. 7A is a flowchart that illustrates a process for performing a restore operation, according to one embodiment. The process begins at 702 by determining if there is a request to restore a local file. If there is a request to restore a local file, the process, at 704, retrieves an unique file identifier, as well as the offset and the size of data segments. At 706, the process queries library server 165 with the unique file identifier to identify a shared file. At 708, the process receives data segment(s) of the shared file from library server 165 based on the offset and the size of the data segments.

At 710, the process synthesizes (or creates) the local file from a backup image (e.g., from backup image 155(1) and backup metadata 160(1) maintained by backup server 135 as shown in FIG. 1) and the (received) data segment(s) (of the shared file). At 712, the process restores the local file (e.g., in conjunction with restore module 145). At 714, the process determines if there is another request (e.g., to restore another local file).

Figure 7B:
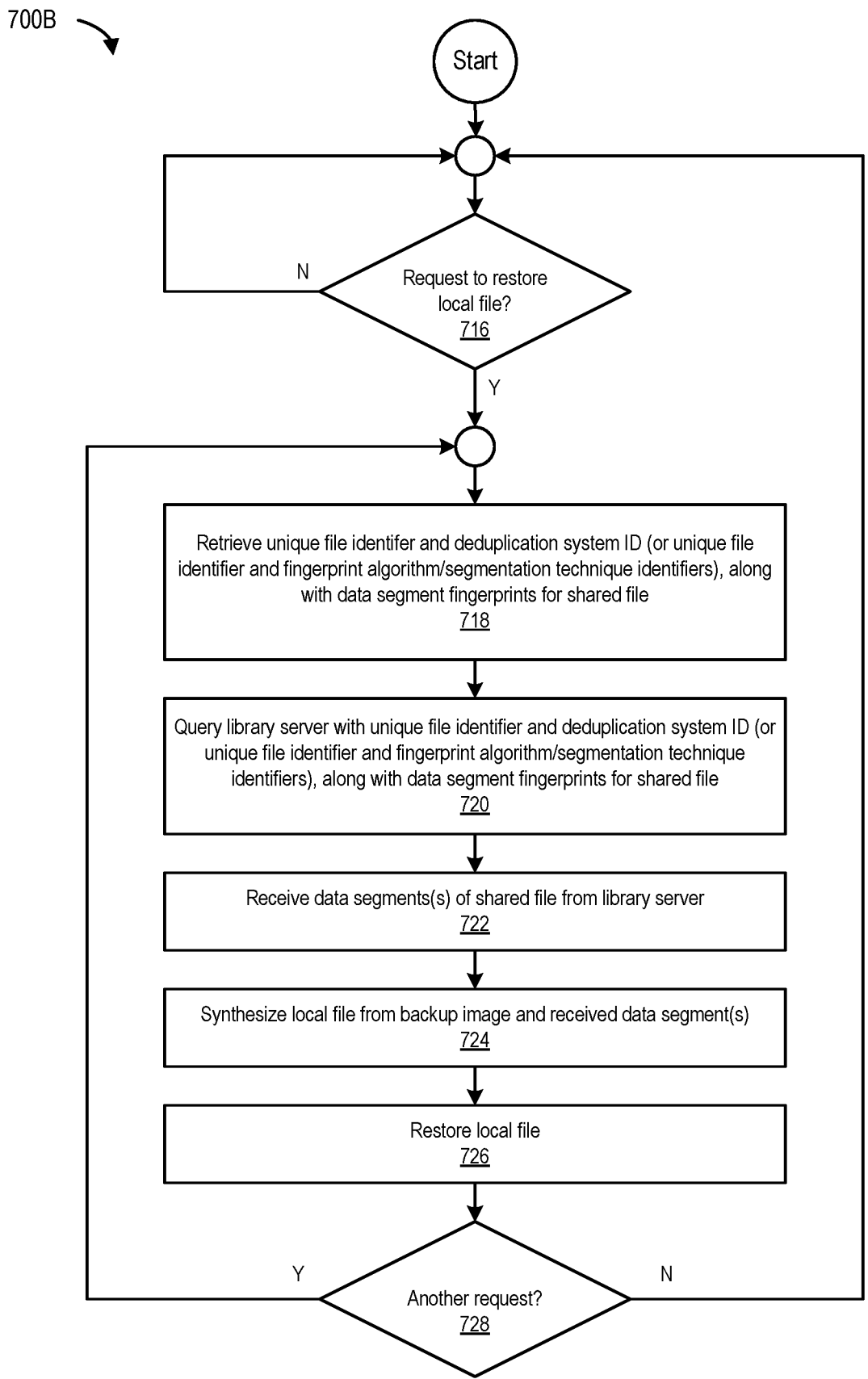
FIG. 7B is a flowchart that illustrates a process for performing a restore operation, according to one embodiment of the present disclosure.

FIG. 7B is a flowchart that illustrates a process for performing a restore operation, according to one embodiment. The process begins at 716 by determining if there is a request to restore a local file. At 718, the process retrieves a unique file identifier and a deduplication system ID (or a unique file identifier and fingerprint algorithm/segmentation technique identifiers), along with data segment fingerprints for a shared file (that is the local file). At 720, the process queries library server 165 with the unique file identifier and the deduplication system ID (or the unique file identifier and the fingerprint algorithm/segmentation technique identifiers), along with the data segment fingerprints for the shared file.

At 722, the process receives data segment(s) of the shared file from library server 165. At 724, the process synthesizes (or generates) the local file from one or more backup images and the (received) data segment(s). At 726, the process restores the local file, and at 728 determines if there is another request (e.g., to restore another local file).

Figure 7C:
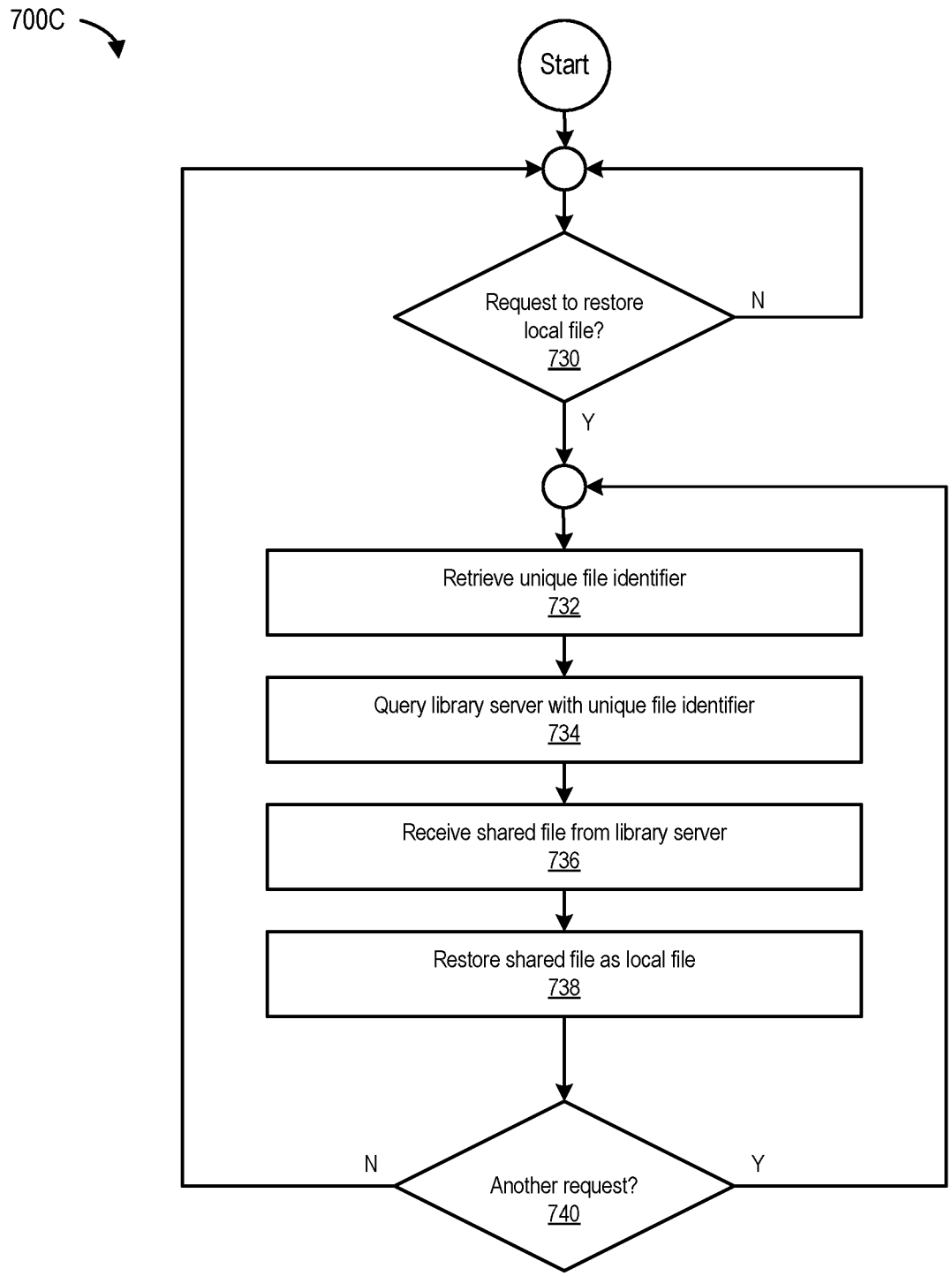
FIG. 7C is a flowchart that illustrates a process for performing a restore operation, according to one embodiment of the present disclosure.

FIG. 7C is a flowchart that illustrates a process for performing a restore operation, according to one embodiment. The process begins at 730 by determining if there is a request to restore a local file. If there is a request to restore a local file, the process, at 732, retrieves the unique file identifier. At 734, the process queries library server 165 with the unique file identifier. At 736, the process receives the shared file from library server 165, and at 738, restores the shared file as the local file. At 740, the process determines if there is another request (e.g., to restore another local file).

Figure 7D:
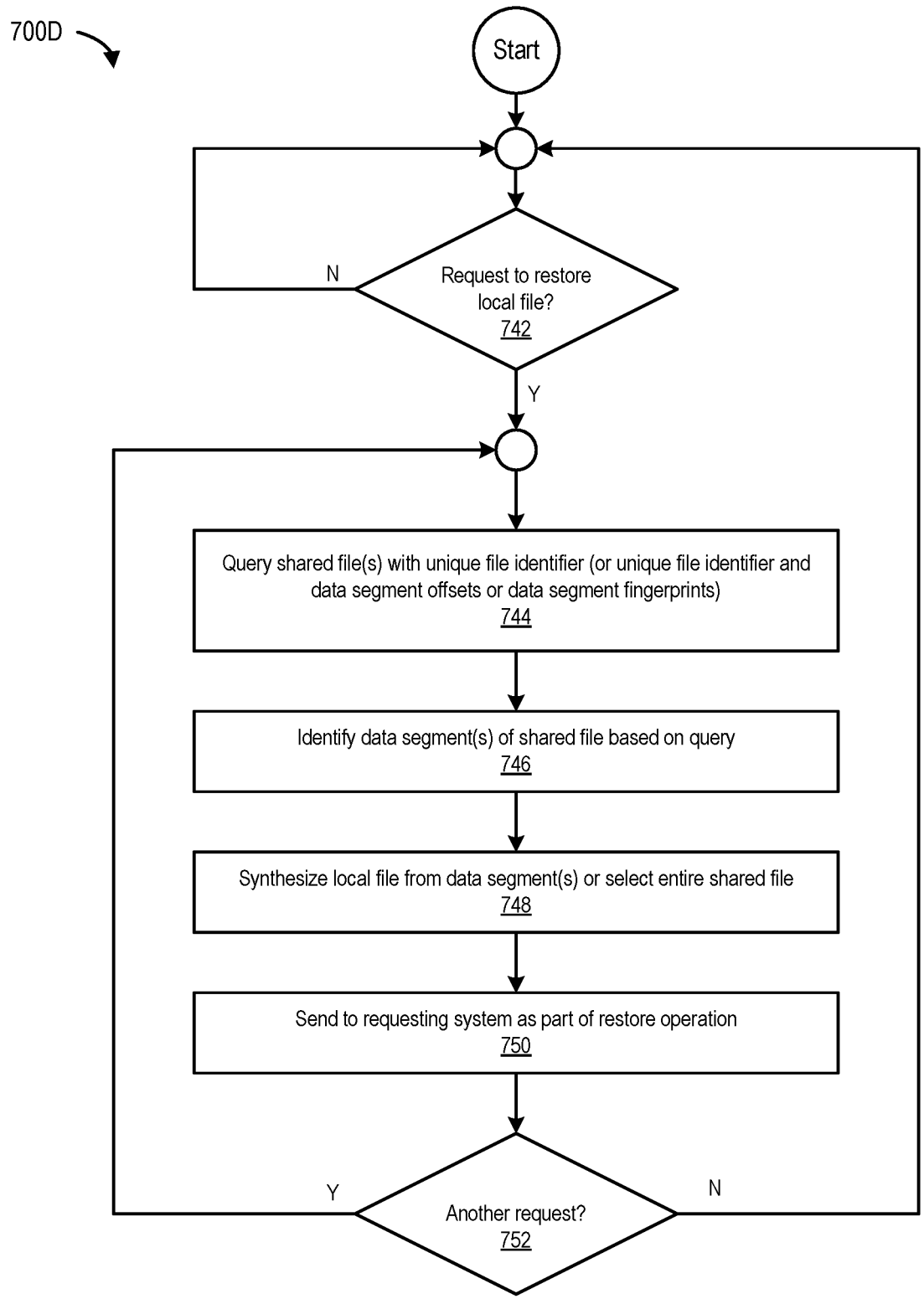
FIG. 7D is a flowchart that illustrates a process for performing a restore operation, according to one embodiment of the present disclosure.

FIG. 7D is a flowchart that illustrates a process for performing a restore operation, according to one embodiment. The process begins at 742 by determining if there is a request to restore a local file. If there is a request to restore a local file, the process, at 744, queries shared file(s) with a unique file identifier (or the unique file identifier and data segment offsets or data segment fingerprints). At 746, the process identifies data segment(s) of the shared file based on the query. At 748, the process synthesizes (or creates) the local file from the data segment(s) or selects the (entire) shared file. At 750, the process sends the synthesized local file to the requesting system (e.g., deduplication system 105(1)) as part of a restore operation. At 752, the process determines if there is another request (e.g., to restore another local file).

It will be appreciated that the ability of multiple clients, systems, and/or servers to perform the foregoing processes of FIGS. 4A, 4B, 5A, 5B, 6A, 6B, 7A, 7B, 7C, and 7D, has one or more advantages. For example, various clients, systems, and/servers can be mixed and matched to perform the foregoing processes enabling efficient use of storage and network resources. In addition, redundant deduplication efforts are avoided reducing computation demands. Further, it will also be appreciated that the shared files described herein are only virtually segmented (not actually segmented or deduplicated), and thus, these shared files remain in their original, unaltered form—enabling these shared files to be efficiently shared among multiple deduplication systems.

An Example Computing System

Figure 8:
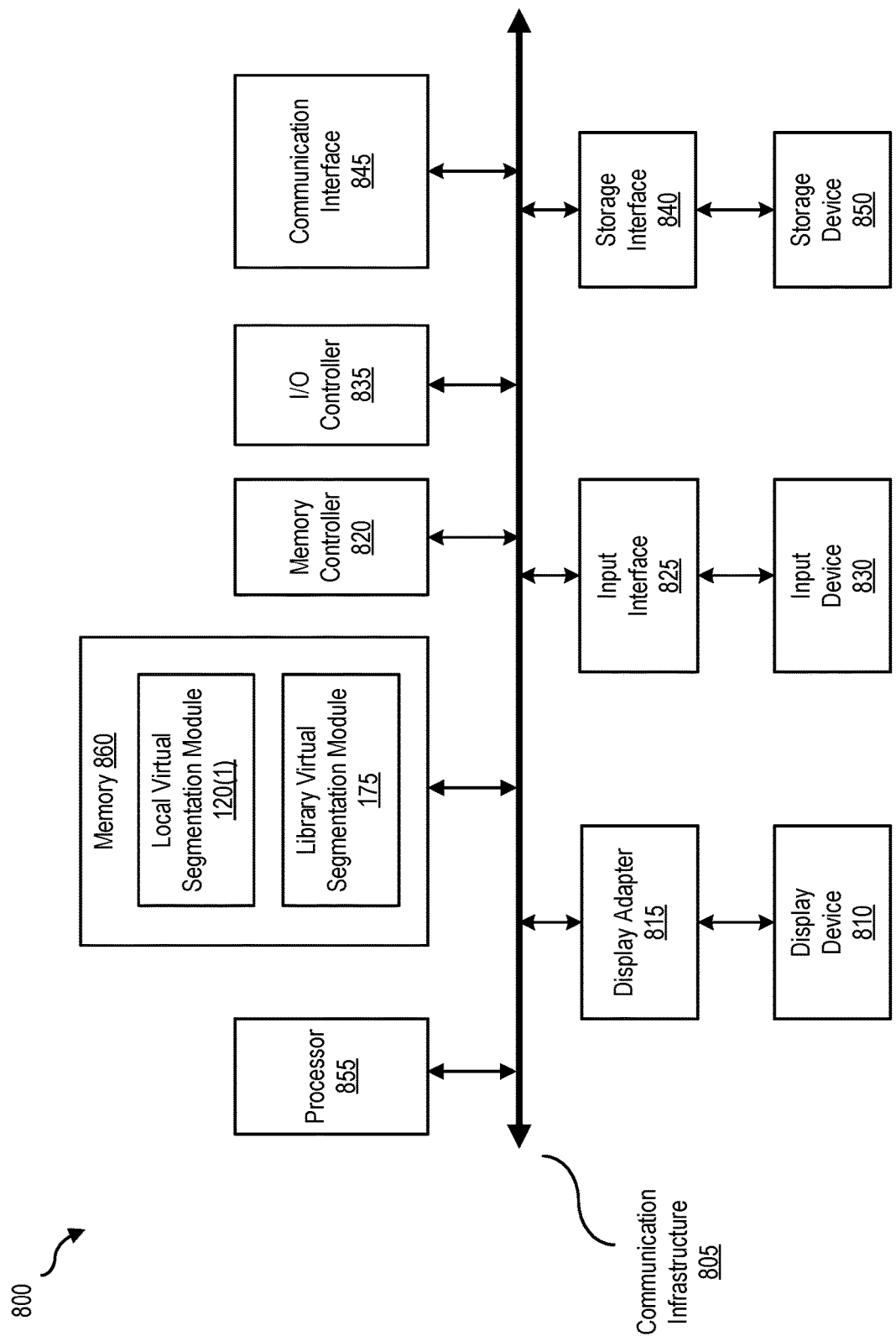
FIG. 8 is a block diagram of a computing system 800 that facilitates shared services between deduplication systems, according to one embodiment of the present disclosure.

FIG. 8 is a block diagram of a computing system 800 that performs shared services between deduplication systems, according to one embodiment. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that implements deduplication systems 105(1)-(N), library server 165, and/or backup server 135, computing system 800 becomes a special purpose computing device that is configured to provide shared services between deduplication systems.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein.

Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing a local virtual segmentation module 120(1) and/or library virtual segmentation module 175 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a virtualization server and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860 and/or various portions of storage device 850. When executed by processor 855, a computer program loaded into computing system 800 may cause processor 855 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

An Example Networking Environment

Figure 9:
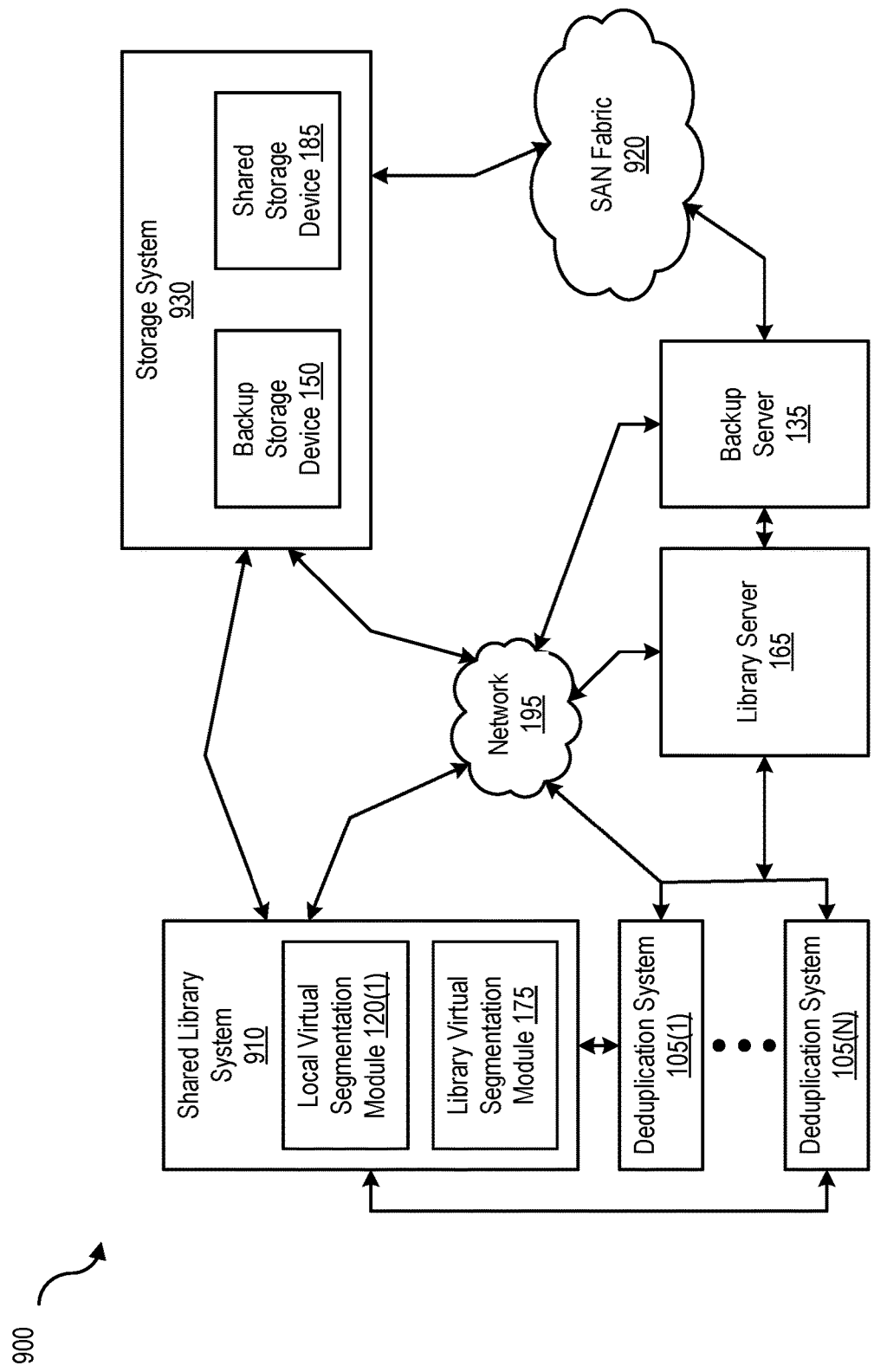
FIG. 9 is a block diagram of a networking system, according to one embodiment of the present disclosure.

FIG. 9 is a block diagram of a networking system, according to one embodiment. In certain embodiments, network-attached storage (NAS) devices may be configured to communicate with deduplication systems 105(1)-(N), library server 165, and/or backup server 135 using various protocols, such as Network File System (NFS), Server Message Block (SMB), or Common Internet File System (CIFS). Network 195 generally represents any type or form of computer network or architecture capable of facilitating communication between deduplication systems 105(1)-(N), library server 165, and/or backup server 135. In certain embodiments, a communication interface, such as communication interface 845 in FIG. 8, may be used to provide connectivity between deduplication systems 105(1)-(N), library server 165, and/or backup server 135, and network 195. It should be noted that the embodiments described and/or illustrated herein are not limited to the Internet or any particular network-based environment. For example, network 195 can be a Storage Area Network (SAN).

In one embodiment, all or a portion of one or more of the disclosed embodiments may be encoded as a computer program and loaded onto and executed by the deduplication systems 105(1)-(N), library server 165, and/or backup server 135, or any combination thereof. All or a portion of one or more of the embodiments disclosed herein may also be encoded as a computer program, stored on deduplication systems 105(1)-(N), library server 165, and/or backup server 135, and distributed over network 195. In some examples, all or a portion of deduplication systems 105(1)-(N), library server 165, and/or backup server 135 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment. In addition, one or more of the components described herein may transform data, physical devices, and/or representations of physical devices from one form to another. For example, deduplication systems 105(1)-(N), library server 165, and/or backup server 135 may transform the behavior of shared library system 910 and/or deduplication systems 105(1)-(N), library server 165, and/or backup server 135 in order to cause the shared library system 910 and/or deduplication systems 105(1)-(N), library server 165, and/or backup server 135 to shared services between deduplication systems.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
receiving an indication that a local file corresponds to a shared file;
virtually segmenting the shared file into a plurality of data segments, wherein
the virtually segmenting the shared file generates data segment fingerprints and library virtual mapping metadata, and
the library virtual mapping metadata comprises
fingerprint information corresponding to each of the plurality of data segments, and
at least one of a unique file identifier, an offset of each data segment, and a size of each data segment; and
transmitting the library virtual mapping metadata, wherein
the library virtual mapping metadata is configured to be used in a subsequent deduplication operation.

2. The computer-implemented method of claim 1, wherein
the shared file exists in a library of shared files, and
the library of shared files is maintained by a library server.

3. The computer-implemented method of claim 1, wherein
the library virtual mapping metadata is transmitted from a library server to a deduplication system.

4. The computer-implemented method of claim 3, wherein
the library virtual mapping metadata identifies the deduplication system, and
the library virtual mapping metadata permits identification of one or more data segments of the plurality of data segments of the local file that can be excluded from a backup and deduplication operation.

5. The computer-implemented method of claim 3, further comprising:
transmitting, to the deduplication server, a name of a file fingerprinting algorithm used to generate the data segment fingerprints, wherein
the name of the file generating algorithm is configured to be used by the deduplication server to generate one or more local file identifiers corresponding to the local file.

6. The computer-implemented method of claim 1, wherein
the library virtual mapping metadata is further configured to permit identification of one or more data segments of the plurality of data segments of the shared file that can be excluded from a subsequent backup and deduplication operation.

7. The computer-implemented method of claim 1, wherein
the shared file is shared by a plurality of deduplication systems.

8. The computer-implemented method of claim 1, further comprising:
storing the library virtual mapping metadata.

9. A non-transitory computer-readable storage medium comprising program instructions executable to perform a method comprising:
receiving an indication that a local file corresponds to a shared file;
virtually segmenting the shared file into a plurality of data segments, wherein
the virtually segmenting the shared file generates data segment fingerprints and library virtual mapping metadata, and
the library virtual mapping metadata comprises
fingerprint information corresponding to each of the plurality of data segments, and
at least one of a unique file identifier, an offset of each data segment, and a size of each data segment; and
transmitting the library virtual mapping metadata, wherein
the library virtual mapping metadata is configured to be used in a subsequent deduplication operation.

10. The non-transitory computer-readable storage medium of claim 9, wherein
the shared file exists in a library of shared files, and
the library of shared files is maintained by a library server.

11. The non-transitory computer-readable storage medium of claim 9, wherein
the library virtual mapping metadata is transmitted from a library server to a deduplication system.

12. The non-transitory computer-readable storage medium of claim 11, wherein
the library virtual mapping metadata identifies the deduplication system, and
the library virtual mapping metadata permits identification of one or more data segments of the plurality of data segments of the local file that can be excluded from a backup and deduplication operation.

13. The non-transitory computer-readable storage medium of claim 11, wherein the method further comprises:
transmitting, to the deduplication server, a name of a file fingerprinting algorithm used to generate the data segment fingerprints, wherein the name of the file generating algorithm is configured to be used by the deduplication server to generate one or more local file identifiers corresponding to the local file.

14. The non-transitory computer-readable storage medium of claim 9, wherein
the library virtual mapping metadata is further configured to permit identification of one or more data segments of the plurality of data segments of the shared file that can be excluded from a subsequent backup and deduplication operation.

15. A system comprising:
one or more processors; and
a memory coupled to the one or more processors, wherein the memory stores program instructions executable by the one or more processors to perform a method comprising
receiving an indication that a local file corresponds to a shared file,
virtually segmenting the shared file into a plurality of data segments, wherein
the virtually segmenting the shared file generates data segment fingerprints and library virtual mapping metadata, and
the library virtual mapping metadata comprises
fingerprint information corresponding to each of the plurality of data segments, and
at least one of a unique file identifier, an offset of each data segment, and a size of each data segment, and
transmitting the library virtual mapping metadata, wherein
the library virtual mapping metadata is configured to be used in a subsequent deduplication operation.

16. The system of claim 15, wherein
the shared file exists in a library of shared files, and
the library of shared files is maintained by a library server.

17. The system of claim 15, wherein
the library virtual mapping metadata is transmitted from a library server to a deduplication system.

18. The system of claim 17, wherein
the library virtual mapping metadata identifies the deduplication system, and
the library virtual mapping metadata permits identification of one or more data segments of the plurality of data segments of the local file that can be excluded from a backup and deduplication operation.

19. The system of claim 17, wherein the method further comprises:
transmitting, to the deduplication server, a name of a file fingerprinting algorithm used to generate the data segment fingerprints, wherein
the name of the file generating algorithm is configured to be used by the deduplication server to generate one or more local file identifiers corresponding to the local file.

20. The system of claim 15, wherein
the library virtual mapping metadata is further configured to permit identification of one or more data segments of the plurality of data segments of the shared file that can be excluded from a subsequent backup and deduplication operation.

* * * * *